United States Patent
Xia et al.

(10) Patent No.: US 7,522,368 B2
(45) Date of Patent: Apr. 21, 2009

(54) DIFFERENTIAL VOICE COIL MOTOR CONTROL

(75) Inventors: Degang Xia, Allen, TX (US); Robert E. Whyte, Jr., Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/733,717

(22) Filed: Apr. 10, 2007

(65) Prior Publication Data

US 2007/0236825 A1 Oct. 11, 2007

Related U.S. Application Data

(60) Provisional application No. 60/744,541, filed on Apr. 10, 2006, provisional application No. 60/744,612, filed on Apr. 11, 2006.

(51) Int. Cl.
*G11B 5/02* (2006.01)
*G11B 5/596* (2006.01)
(52) U.S. Cl. .................. 360/67; 360/78.04; 318/568.22
(58) Field of Classification Search ................. None
See application file for complete search history.

(56) References Cited

U.S. PATENT DOCUMENTS

| | | | | |
|---|---|---|---|---|
| 5,220,547 A | * | 6/1993 | Yasukawa et al. | 369/30.16 |
| 6,707,625 B2 | * | 3/2004 | Leighton et al. | 360/46 |
| 7,042,256 B2 | * | 5/2006 | Brenden | 327/110 |
| 2004/0075502 A1 | * | 4/2004 | Hogervorst | 330/292 |
| 2007/0236164 A1 | * | 10/2007 | Xia et al. | 318/632 |

* cited by examiner

*Primary Examiner*—Jason C Olson
(74) *Attorney, Agent, or Firm*—Dawn V. Stephens; Wade James Brady, III; Frederick J. Telecky, Jr.

(57) ABSTRACT

A disk drive controller including a differential voice coil motor control function is disclosed. The differential voice coil motor control function includes an on-chip compensation network for the inner control loop, including a resistor formed of one or more MOS transistors connected in series. The gate of the MOS transistors in the compensation network is driven with a bias voltage based on a tuning current, where the tuning current is derived so that it varies with process and temperature variations of the integrated circuit, for example with variations in an on-chip capacitor. The on-chip compensation network can be tuned with sufficient precision to properly compensate the inner control loop to provide the desired frequency response in driving the voice coil motor in the disk drive.

29 Claims, 9 Drawing Sheets

US 7,522,368 B2

DIFFERENTIAL VOICE COIL MOTOR CONTROL

CROSS-REFERENCE TO RELATED APPLICATIONS

This application claims priority, under 35 U.S.C. §119(e), of Provisional Application No. 60/744,541, filed Apr. 10, 2006, and of Provisional Application No. 60/744,612, filed Apr. 11, 2006, both of which are incorporated herein by this reference.

STATEMENT REGARDING FEDERALLY SPONSORED RESEARCH OR DEVELOPMENT

Not applicable.

BACKGROUND OF THE INVENTION

This invention is in the field of motor control, and is more specifically directed to control of a voice coil motor in a disk drive system.

Magnetic disk drive technology is the predominant mass non-volatile storage technology in modern personal computer systems, and continues to be an important storage technology for mass storage applications in other devices, such as portable digital audio players. As is fundamental in the field of magnetic disk drives, data is written by magnetizing a location ("domain") of a layer of ferromagnetic material disposed at the surface of a disk platter. Each magnetized domain forms a magnetic dipole, with the stored data value corresponding to the orientation of that dipole. The "writing" of a data bit to a domain is typically accomplished by applying a current to a small electromagnet coil disposed physically near the magnetic disk, with the polarity of the current through the coil determining the orientation of the induced magnetic dipole, and thus the data state written to the disk. In modern disk drives, a magneto-resistive element is used to sense the orientation of the magnetic dipole at selected locations of the disk surface, thus reading the stored data state. Typically, the write coil and the magneto-resistive element are physically placed within a read/write "head".

In conventional disk drive systems, a spindle motor rotates the disk platters, and a "voice coil" motor moves an actuator arm on which the read/write heads are mounted, at a distal end from the motor. The voice coil motor thus moves the read/write heads to the track of the disk surface corresponding to the desired address. Conventional voice coil motors are servo-controlled, in that position indicators on the disk surface are sensed, and fed back to a control loop for adjustment of the position of the actuator arm to the desired location. Typically, an "outer" control loop compares the feedback position signal to the desired position of the actuator, and a torque command value is derived from a difference in these values. The torque command is used to produce a drive current to the voice coil motor that produces a motor torque to move the actuator arm in the desired direction. In conventional voice coil motor control circuits, an "inner" control loop is also included, in which the current applied to the motor is sensed, and applied to a feedback loop for control of this motor current.

FIG. 1 illustrates a conventional drive circuit for a voice coil motor in a disk drive system. VCM digital-to-analog converter (DAC) 22 receives a digital torque command signal TRQ_CMD from the "outer" servo control loop for the voice coil motor, and produces an analog signal via resistor 23 to the negative input of error amplifier 24, which receives reference voltage VREF at its positive input. The single-ended output of error amplifier 24 is applied to power amplifier 28, which generates differential output current $i_{OUT}$ at its output terminals T3 and T4. This output current $i_{OUT}$ is applied to motor M, which presents an impedance to power amplifier 28 in the form of an inductor $L_m$ and a parasitic resistor $R_m$. Sense resistor 31 is included in the loop with motor M, and the voltage across this resistor 31 is sensed by sense amplifier 32, at terminals T5, T6. The output of sense amplifier 32 is applied to a summing node at the output of VCM DAC, via resistor 29. As such, the voltage across sense resistor 31 is applied as negative feedback to the desired torque signal at the output of DAC 22. When the circuit is in balance (i.e., current $i_{OUT}$ is equal to the desired current corresponding to the torque command signal TRQ_CMD), the voltage at the negative input of error amplifier 24 will equal reference voltage VREF.

As fundamental in the control system art, the impedance presented by motor M determines the response characteristic of this inner control loop. Specifically, the inductance $L_m$ of motor M defines a "pole" in the frequency response of this loop, such that the response of the system varies with frequency, and defines a frequency at which oscillation can occur. As known in the art, compensation for the frequency response of the motor can be implemented into the control loop, so that the frequency response of the control loop can meet system requirements, and to avoid instability in operation. In the conventional circuit of FIG. 1, such compensation is realized by way of an R-C network connected across error amplifier 24. In this case, the compensation network includes capacitor 25 connected in parallel with the series network of resistor 26 and capacitor 27. The component values of capacitors 25, 27 and resistor 26 are based on the inductance $L_m$ and resistance $R_m$ of motor M, and on the desired bandwidth (i.e., frequency range over which the control loop has adequate response) for the operating frequencies of the control loop.

As well known in the control systems art, capacitor 27 serves as an integrator in the control loop, which provides higher gain at lower frequencies in the frequency response of the control loop. Resistor 26 flattens the response characteristic, to counteract the 90° phase shift (and corresponding reduced phase margin) inserted into the control loop response by integrating capacitor 27, improving stability. Capacitor 25 rolls off the response at high frequency, beyond the desired cutoff frequency.

As shown in FIG. 1, VCM DAC 22, error amplifier 24, power amplifier 28, and sense amplifier 32 (as well as passive components such as resistors 23, 25) are implemented into a single integrated circuit 20. For voice coil motor M of conventional size and impedance, the component values required for the compensation network of capacitors 25, 27 and resistor 26 is typically realized "off-chip", external to integrated circuit 20. As shown in FIG. 1, this compensation network is connected across terminals T1 and T2 of integrated circuit 20, which are connected to the input and output of error amplifier 24 as shown. Because these components are connected externally, their values can be selected with high precision, providing precise compensation. Conversely, if capacitors 25, 27 and resistor 26 were implemented "on-chip", their component values could vary by as much as 10-20%, which is not tolerable for reasonable compensation of modern voice coil motor control loops.

This conventional voice coil control circuit shown in FIG. 1 is referred to in the art as a "single-ended" control loop, in that the drive current is derived from a single-ended signal at the output of error amplifier 24, driving a single-ended input to pseudo-differential power amplifier 28. As such, the external compensation network can be realized by three external components across two external terminals of integrated circuit 20.

However, many technology trends now favor the use of a fully differential power stage to drive the voice coil motor in modern disk drive systems. The storage density of disk drives (measured in tracks per inch) continues to increase, which requires improved noise rejection capability for the voice coil motor control loop. In addition, the power supply voltage of disk drive controller electronics is also trending lower with continued miniaturization of disk drive systems and with the trend toward battery power, for example in disk drive-based portable digital audio players. This lower power supply voltage level reduces the linear swing "head room" of the control circuit. The use of a fully differential control loop (e.g., a differential error amplifier driving a differential power amplifier) will provide the desired rejection of noise coupling from the power supply, substrate, or other circuit functions, will decrease the total harmonic distortion in the control loop, and also requires one-half the linear swing "head room" of that required for single-ended motor drive as shown in FIG. 1.

However, implementation of conventional external "off-chip" compensation for a fully differential control circuit requires two sets of compensation components. Referring to FIG. 1, two instances of the parallel compensation network of capacitors 25, 27 and resistor 26 will be required for a fully differential stage. This of course requires twice the number of external components, and requires two additional integrated circuit terminal pins, as compared with the single-ended case. The additional expense in components and, more significantly, in pin count and circuit board space, can be prohibitive, especially in miniaturized systems such as digital audio players.

BRIEF SUMMARY OF THE INVENTION

It is therefore an object of this invention to provide a circuit and method of operating the same in which a single compensation network can be used in a fully differential control loop for control a motor such as a voice coil motor in a disk drive.

It is further object of this invention to provide such a circuit and method in which the compensation network can be readily integrated with control circuitry in the same integrated circuit.

It is a further object of this invention to provide such a circuit and method in which the frequency response of the control loop can be closely tuned for optimum operation.

It is a further object of this invention to provide such a circuit and method in which the compensation is constant, to a first order, over variations in manufacturing processes and operating temperature.

It is a further object of this invention to provide such a circuit and method in which a single-ended command signal is summed with a differential feedback signal, thus reducing the cost of an input digital-to-analog converter.

Other objects and advantages of this invention will be apparent to those of ordinary skill in the art having reference to the following specification together with its drawings.

The present invention may be implemented into a feedback control circuit including a tunable transconductance cell that receives a summed differential voltage compensation network is provided for a full differential signal path. The transconductance cell produces a differential current output in response to a differential input signal, in which the gain level is tunable. A single compensation network can be realized externally or in the same integrated circuit as the transconductance cell, connected across the differential output terminals of the transconductance cell.

DETAILED DESCRIPTION OF THE INVENTION

The present invention will be described in connection with its preferred embodiment, namely as implemented into a disk drive controller for a computer or other digital system, because it is contemplated that this invention will be especially beneficial when used in such an application. However, it is also contemplated that this invention may provide important benefits and advantages in other applications besides that described in this specification. Accordingly, it is to be understood that the following description is provided by way of example only, and is not intended to limit the true scope of this invention as claimed.

Figure 2:
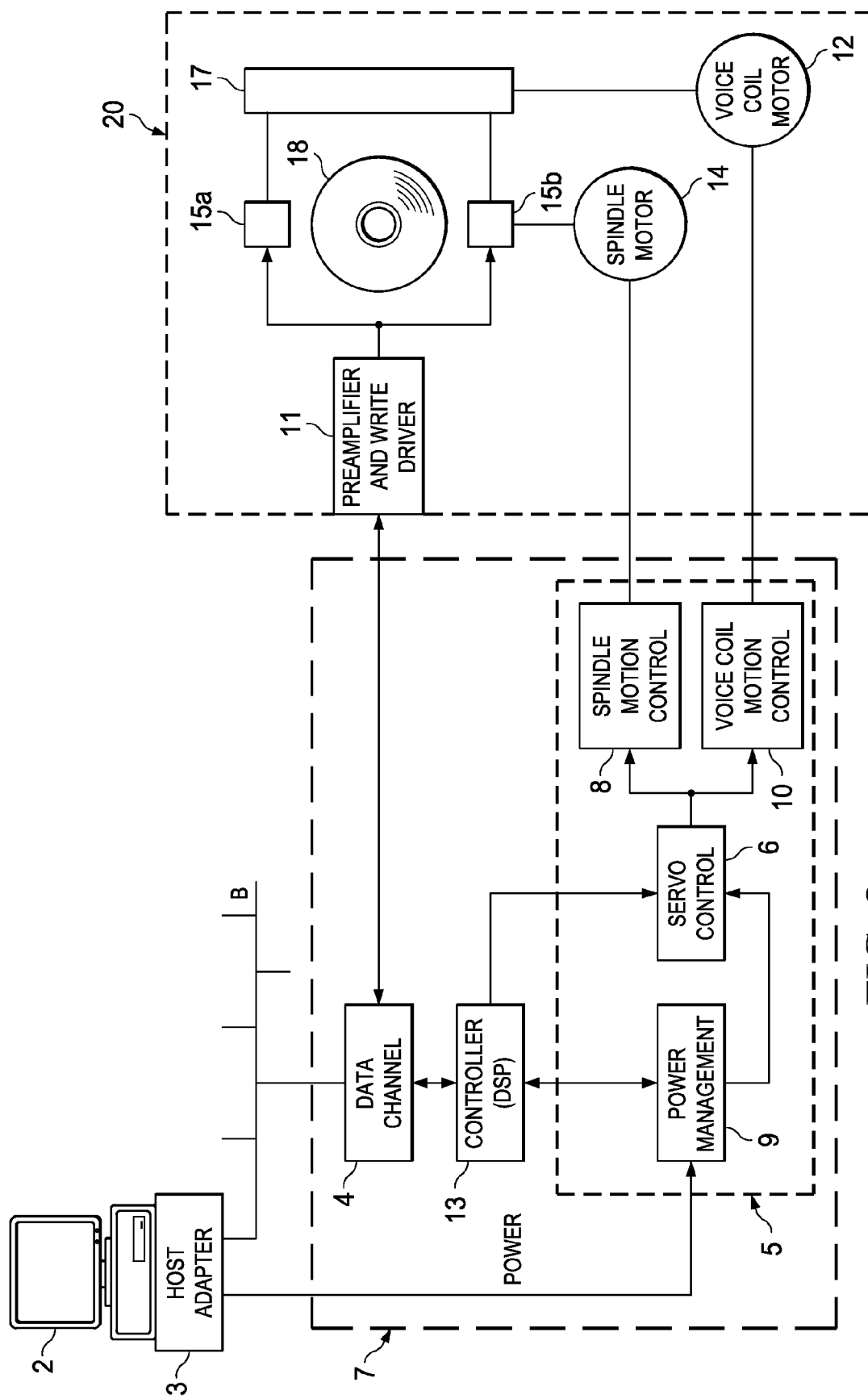
FIG. 2 is an electrical diagram, in block form, of a disk drive system constructed according to the preferred embodiment of the invention.

FIG. 2 illustrates an example of a computer including a disk drive system, into which the preferred embodiment of the invention is implemented. In this example, personal computer or workstation 2 is realized in the conventional manner, including the appropriate central processing unit (CPU), random access memory (RAM), video and sound cards or functionality, network interface capability, and the like. Also contained within computer 2 is host adapter 3, which connects on one side to the system bus of computer 2, and on the other side to bus B, to which disk drive controller 7 is connected. Bus B is preferably implemented according to conventional standards, examples of which include the Enhanced Integrated Drive Electronics (EIDE) standard or the Small Computer System Interface (SCSI) standard. Other disk storage devices (hard disk controllers, floppy drive controllers, etc.) and other peripherals may also be connected to bus B, as desired and in the conventional manner. Alternatively, system 2 may be a smaller-scale system, such as a portable digital audio player or the like.

Disk drive controller 7, in this example, corresponds to a disk drive controller architecture in which the drive electronics are physically implemented at the disk drive, rather than as a controller board within computer 2 itself. Of course, in larger scale systems, controller 7 may be implemented within computer 2. In the generalized block diagram of FIG. 1, controller 7 includes several integrated circuits, including data channel 4 in the data path between computer 2 and the medium itself. Disk drive controller 7 also includes controller 13, which is preferably implemented as a digital signal processor (DSP) or other programmable processor, along with the appropriate memory resources (not shown), which typically include some or all of read-only memory (ROM), random access memory (RAM), and other non-volatile storage such as flash memory. Controller 13 controls the operation of the disk drive system, including such functions as address mapping, error correction coding and decoding, and the like. Interface circuitry coupled between bus B and data channel 4, and other custom logic circuitry including clock generation circuits and the like also may be included within disk drive controller 7.

Head-disk assembly 20 of the disk drive system includes the electronic and mechanical components that are involved in the writing and reading of magnetically stored data. In this example, head-disk assembly 20 includes one or more disks 18 having ferromagnetic surfaces (preferably on both sides) that spin about their axis under the control of spindle motor 14. Multiple read/write head assemblies 15a, 15b are movable by actuator arm 17, and are coupled to preamplifier and write driver function 11. On the read side, preamplifier and write driver function 11 receives sensed currents from read/write head assemblies 15a, 15b in disk read operations, and amplifies and forwards signals corresponding to these sensed currents to data channel circuitry 4 in disk drive controller 7. On the write side, write driver circuitry within preamplifier and write driver function receives data to be written to a particular location of disk 18 from data channel 4, and converts these data to the appropriate signals for writing to disk 18 via read/write head assemblies 15a, 15b. Other circuit functions may also be included within the functional block labeled preamplifier and write driver function 11, including circuitry for applying a DC bias to the magnetoresistive read head in read/write head assemblies 15a, 15b, and also fly height control circuitry for controllably heating read/write head assemblies 15a, 15b to maintain a constant fly height, as described in U.S. Patent Application Publication No. US 2005/0105204 A1, published May 19, 2005 based on an application by Bloodworth et al., assigned to Texas Instruments Incorporated and incorporated herein by reference.

Figure 1:
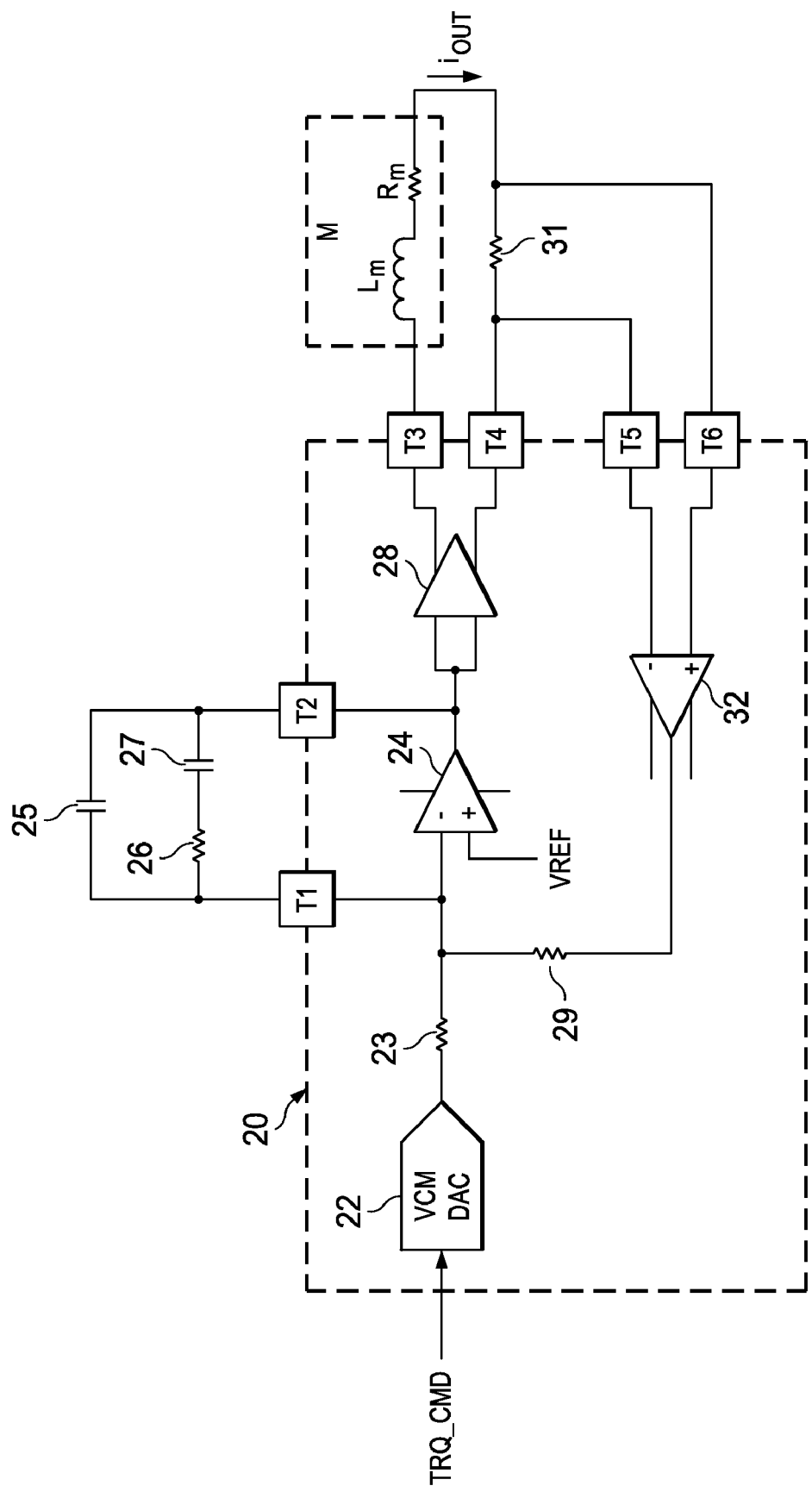
FIG. 1 is an electrical diagram, in schematic form, of a conventional voice coil motor control and drive circuit.

In this example, disk drive controller 7 includes servo control 6, which communicates with spindle motion control function 8 and voice coil motion control function 10. Spindle motion control function 8 drives spindle motor 14 in head-disk assembly 20 according to control signals from servo control 6, while voice coil motion control function 10 drives voice coil motor 12 according to such control signals. As known in the art, spindle motor 14 spins disks 18 about their axis, and voice coil motor 12 controls the radial position of actuator arm 17 at disks 18. In this manner, spindle motor 14 and voice coil motor 12 place the read/write head assemblies 15a, 15b at the desired locations of disk surface 18, according to an address value communicated by controller 13, so that the data may be written to or read from the appropriate physical location of disks 18. Power management function 9 receives power from computer 2 on line PWR as shown in FIG. 1; and includes one or more voltage regulators by way of which it generates and controls various voltages within disk drive controller 7 and also within head-disk assembly 20. The functions of servo control 6, spindle motion control 8, power management function 9, and voice coil motion control 10 may be integrated into a single integrated circuit 5, for miniaturization of the disk drive system and to reduce the manufacturing cost.

Figure 3:
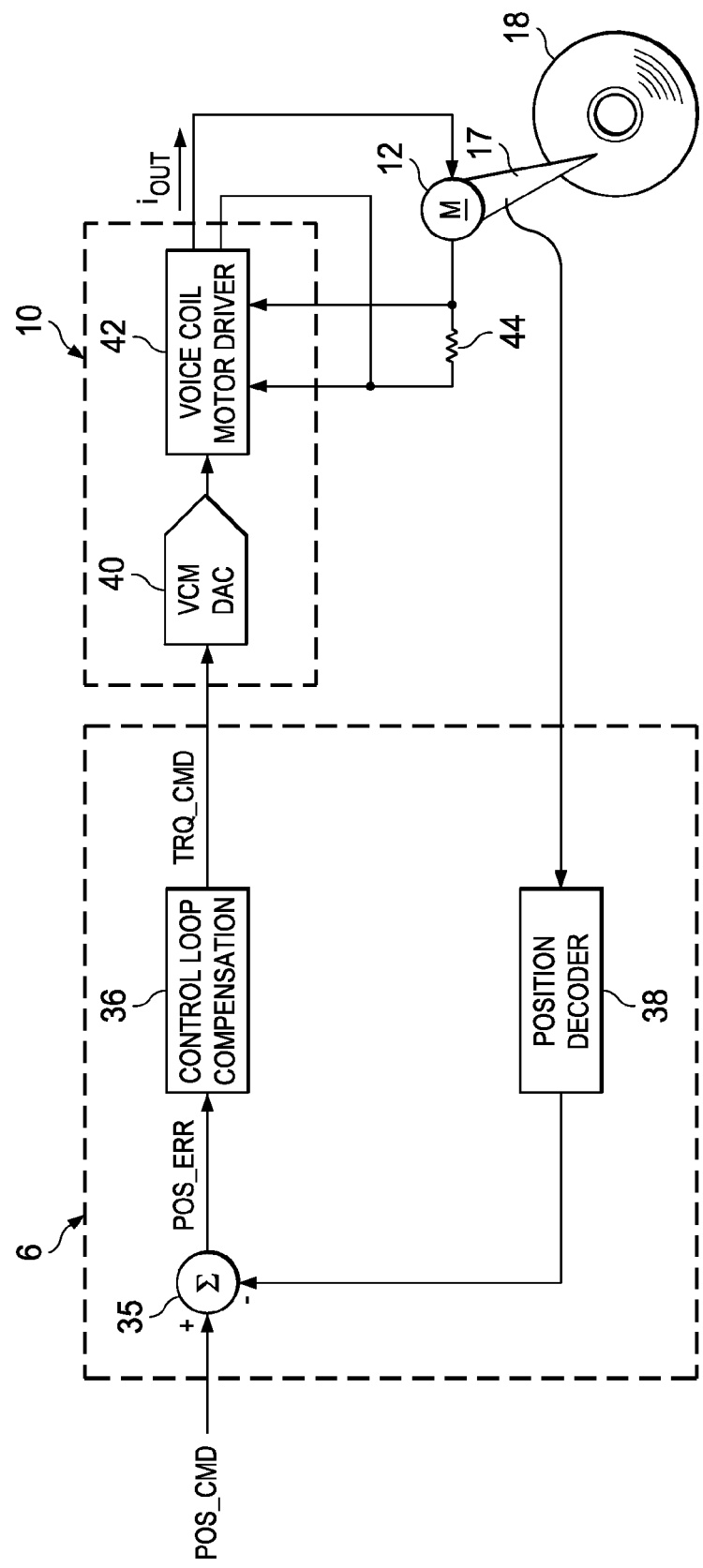
FIG. 3 is an electrical diagram, in block form, of the servo control and voice coil motor control functions in the disk drive system of FIG. 2, according to the preferred embodiment of the invention.

Referring now to FIG. 3, the construction and operation of servo control 6 and voice coil motion control function 8, in controlling the motion impelled by voice coil motor 12 according to the preferred embodiment of this invention, will now be described. According to this embodiment of the invention, two feedback loops are involved in this control function. Servo control 6 manages the "outer" control loop in this example, by monitoring the position of actuator arm 17 relative to the surface of disks 18 relative to a desired position signal. Voice coil motion control function 10 manages the "inner" control loop, by monitoring the current applied to voice coil motor 12 (and thus the torque applied by voice coil motor 12 to actuator arm 17), relative to a torque command signal produced by servo control 6 from its outer loop control function.

In this embodiment of the invention, servo control 6 receives position command signal POS_CMD from controller 13 in disk drive controller 7. Signal POS_CMD may be in either the digital or analog domain, depending on the particular construction of servo control 6. Servo control 6 also includes position decoder 38, which receives a signal from preamplifier 11 indicative of the current radial position of actuator arm 17 at disks 18. As known in the art, modern disk drives generally include position indicators that are disposed at various radii of the disk surface, for example between each track, and that present a signal to read/write heads 15 indicative of radius or track position. Position decoder 38 corresponds to circuitry in servo control 6 that is capable of decoding a useful position signal from the indicator signal, in a format suitable for comparison with position command signal POS_CMD. In the embodiment of FIG. 3, summing function 35 generates error signal POS_ERR corresponding to the difference between position command signal POS_CMD and the feedback signal produced by position decoder 38. Error signal POS_ERR thus corresponds to the current difference between the actual position of actuator arm 17 and the desired position.

Control loop compensation function 36 receives error signal POS_ERR, and filters or otherwise processes this signal in the conventional manner, in either the analog or digital domain as appropriate, to ensure stable frequency response of the outer control loop. The output of control loop compensation function 36, and also the output of servo control 6 to voice coil motor control function 10, is torque command TRQ_CMD. According to this embodiment of the invention, torque command TRQ_CMD is a control signal indicative of the direction and magnitude of the torque to be applied by voice coil motor 12 to move actuator arm 17 from its current position toward its desired position.

In this embodiment of the invention, torque command signal TRQ_CMD is a digital signal, and as such is received by VCM DAC 40, and converted to the analog domain for application to voice coil motor driver 42. As will be described in further detail below, voice coil motor driver 42 produces output current $i_{OUT}$ in response to torque command signal TRQ_CMD and in response to a feedback signal of a voltage sensed across sense resistor 44, which is in series with voice coil motor 12 and thus conducts output current $i_{OUT}$. In this embodiment of the invention, voice coil motor driver 42 is a fully differential drive stage, which enables the use of a lower power supply voltage than conventional single-ended voice coil motor drivers, and which reduces the linear swing headroom required of the drive circuitry.

Figure 4:
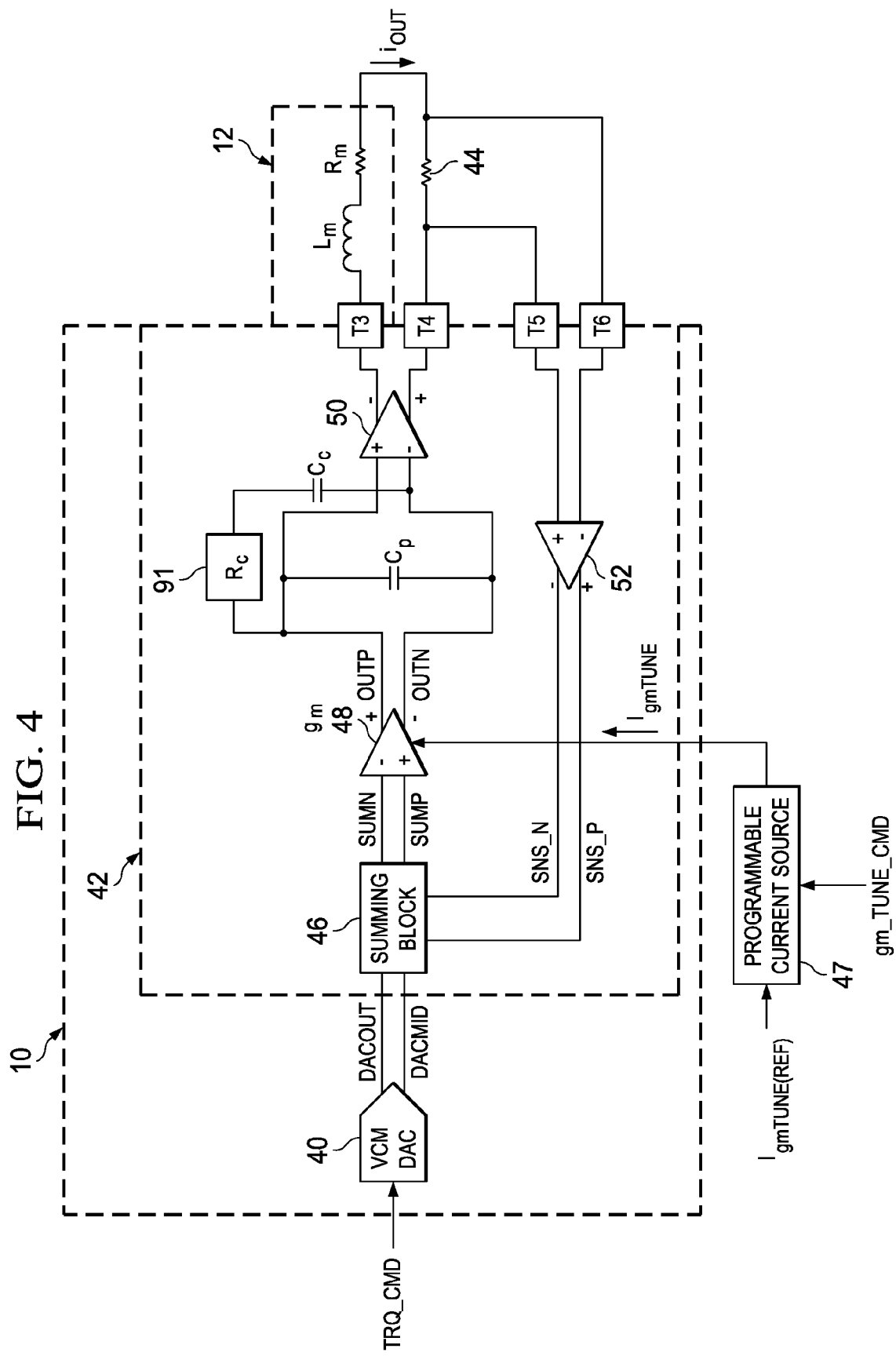
FIG. 4 is an electrical diagram, in block and schematic form, of the voice coil motor control function for a disk drive system, according to the preferred embodiment of the invention.

FIG. 4 illustrates, in further detail, the construction of voice coil motor control function 10 according to this preferred embodiment of the invention. As mentioned above, VCM DAC 40 receives digital torque command signal TRQ_CMD from servo control 6, and converts it into analog signal DACOUT. According to this preferred embodiment of the invention, VCM DAC 40 also produces reference signal DACMID, which is an analog signal that is programmed or otherwise set to a constant mid-level or null signal. As known in the art, and as evident from its function, the torque applied by voice coil motor 12 may be in either polarity, depending upon the direction in which actuator arm 17 is to move. Accordingly, analog signal DACOUT corresponding to digital torque command signal TRQ_CMD may either be above or below the mid-level, or null, signal DACMID. Signals DACOUT, DACMID are applied to summing block 46, as are feedback signals SNS_N, SNS_P.

This arrangement of analog signal DACOUT permits VCM DAC 40 to be constructed as a single-ended digital-to-analog converter, rather than as a fully differential DAC, despite construction of voice coil motor driver 42 as fully differential. Indeed, VCM DAC 40 can be constructed to be relatively simple, according to this embodiment of the invention, for example constructed as a conventional dual resistor string DAC, an example of which is described in U.S. Pat. No. 5,977,898, issued Nov. 2, 1999, assigned to Texas Instruments Incorporated and incorporated herein by this reference. The mid-level output signal DACMID can simply be taken as the fixed middle value of the digital-to-analog conversion circuit. This greatly reduces the circuit complexity and size of VCM DAC 40, thus reducing the cost and complexity of voice coil motor control function 10.

As shown in FIG. 4, sense resistor 44 is connected in series with voice coil motor 12, and as such conducts current $i_{OUT}$. Terminals T5, T6 of voice coil motor control function 10 are connected across sense resistor 44, and are applied to inputs of sense amplifier 52. Sense amplifier 52 thus drives a differential signal onto lines SNS_N, SNS_P that corresponds to the voltage sensed across sense resistor 44, and thus corresponds to the current $i_{OUT}$ driven by voice coil motor driver 42. Summing block 46 receives the differential signal on lines SNS_N, SNS_P, and sums this signal with the differential signal of lines DACOUT, DACMID, as will now be described relative to FIGS. 5*a* and 5*b*.

Figure 5A:
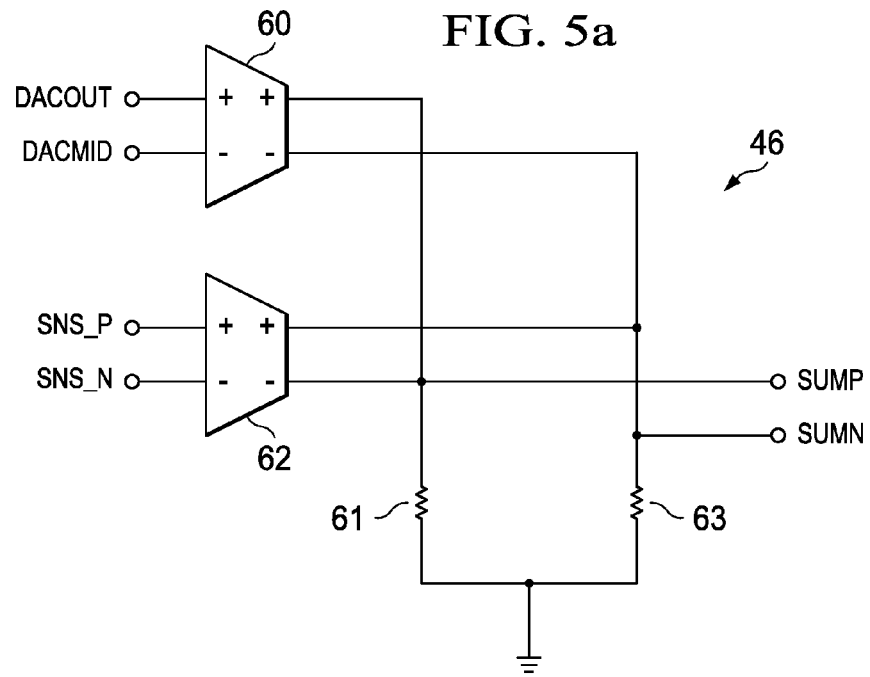
FIGS. 5a and 5b are electrical diagrams, in block and schematic form, respectively, of a summing block in the voice coil motor control function of FIG. 4, according to the preferred embodiment of the invention.

FIG. 5*a* illustrates the construction of summing block 46 according to the preferred embodiment of the invention. As shown in FIG. 5*a*, $g_m$ cell 60 receives the differential signal at lines DACOUT, DACMID, and $g_m$ cell 62 receives the differential signal at lines SNSOUT_P, SNSOUT_N. Each of $g_m$ cells 60, 62 presents a high input impedance, as will be especially apparent from FIG. 5*b*. The high impedance input of $g_m$ cell 60 enables direct connection of summing block 46 to VCM DAC 40 without requiring an additional buffer, as would otherwise be required from a simple DAC such as a dual resistor DAC. In addition, the high impedance input of $g_m$ cell 62 permits the drive of sense amplifier 52 to be relatively small. The differential outputs of each of $g_m$ cells 60, 62 are applied to summing nodes SUMP, SUMN, each of which are connected to ground via resistors 61, 63, respectively. As shown in FIG. 5*a*, $g_m$ cells 60, 62 are each differential $g_m$ cells, with the positive outputs of cells 60, 62 connected to summing node SUMP at resistor 61, and the negative outputs of cells 60, 62 connected to summing node SUMN at resistor 63.

As mentioned above, VCM DAC 40 is effectively a single-ended DAC, with its output DACOUT presented differentially relative to a mid-level reference signal DACMID. As such, the amplitude of the differential output of VCM DAC 40 is effectively one-half that of the range of the differential signal at lines SNS_P, SNS_N. Accordingly, the transconductance of $g_m$ cell 60 is arranged to be twice that of $g_m$ cell 62. In this example, $g_m$ cell 60 can be constructed to have a transconductance of 1/R, and $g_m$ cell 62 can be constructed to have a transconductance of 1/2R, with R being the resistance value of resistors 61, 63.

Figure 5B:
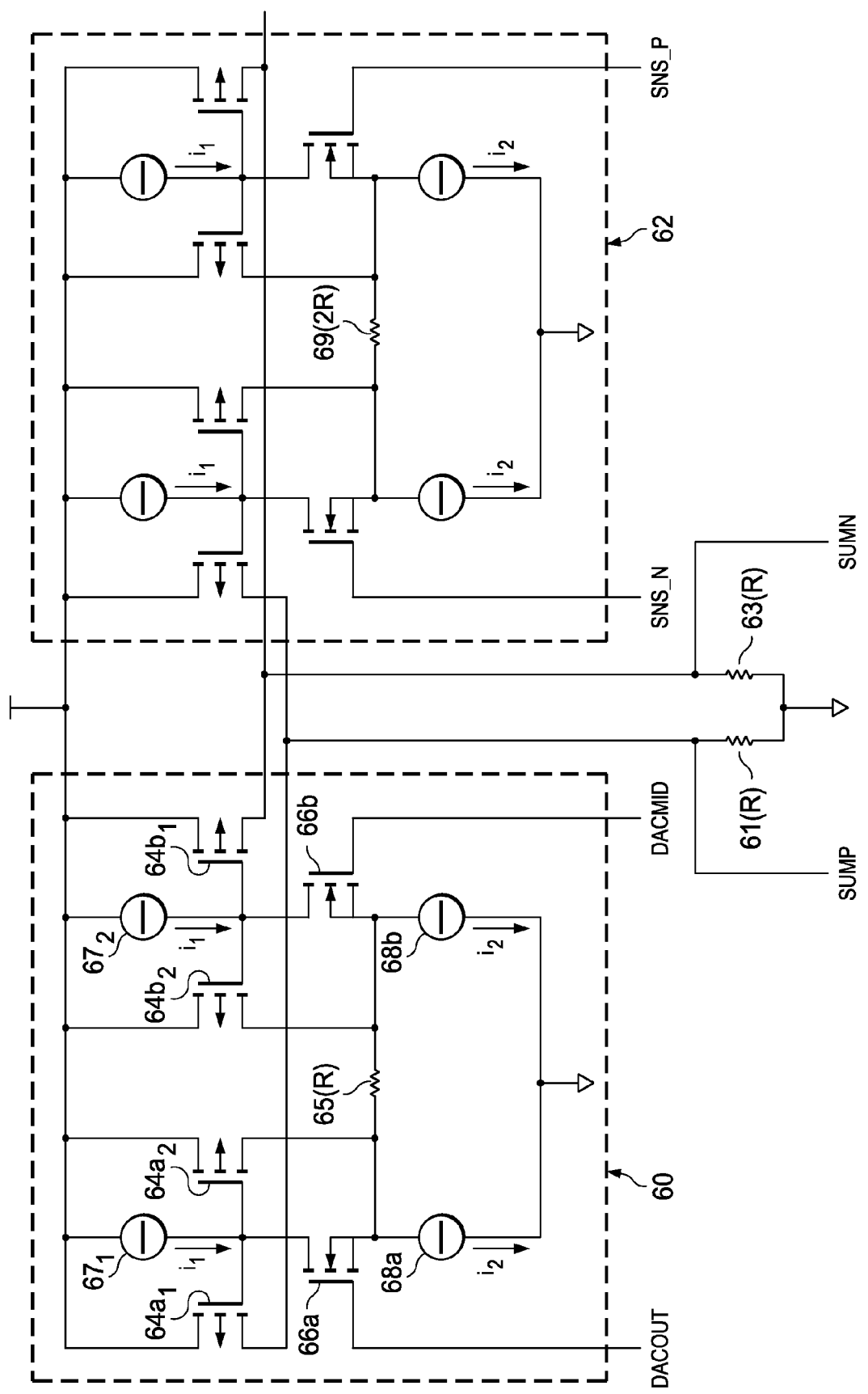

FIG. 5*b* shows a specific example the construction of $g_m$ cells 60, 62 in summing block 46, according to the preferred embodiment of the invention. It is to be understood that other $g_m$ cell circuit arrangements can alternatively be used to realize $g_m$ cells 60, 62, within the scope of this invention.

In this embodiment of the invention, $g_m$ cell 60 has a pair of differential legs, one leg that includes n-channel MOS transistor 66*a* receiving signal line DACOUT at its gate, and the other leg that includes n-channel MOS transistor 66*b* receiving signal line DACMID at its gate. The drain of transistor 66*a* is connected to receive current $i_1$ from current source 67$_1$, and the source and body node of this device are connected to current source 68*a*, which conducts current $i_2$ to ground, current $i_2$ being larger than current $i_1$. Similarly, the drain of transistor 66*b* receives current $i_1$ from current source 67$_2$, and the source and body node of transistor 66*b* are connected through current source 68*b*, which also conducts current $i_2$ to ground. The drain of transistor 66*a* is also connected to the gates of p-channel metal-oxide-semiconductor (MOS) transistors 64*a*$_1$ and 64*a*$_2$, each of which has its source biased to the $V_{dd}$ power supply voltage. The drain of transistor 64*a*$_2$ is connected to the source of transistors 66*a*, and the drain of transistor 64*a*$_1$ is connected to resistor 61, at node SUMP. Similarly, the drain of transistor 66*b* is connected to the gates of p-channel metal-oxide-semiconductor (MOS) transistors 64*b*$_1$ and 64*b*$_2$, each of which has its source biased to the $V_{dd}$ power supply voltage. The drain of transistor 64*b*$_2$ is connected to the source of transistor 66*b*, and the drain of transistor 64*b*$_1$ is connected to resistor 63, at node SUMN. Resistor 65 is connected at the nodes between the sources of transistors 66*a* and 66*b*. Resistor 65 has a resistance R, which is the same as the resistance R of resistors 61, 63. Summing node SUMN is coupled to ground via resistor 61, and summing node SUMP is coupled to ground via resistor 63. Preferably, transistors 64, 66 are all matched in size to one another.

As shown in FIG. 5*b*, $g_m$ cell 62 is identically constructed as $g_m$ cell 60, and as such will not be described in detail here. In $g_m$ cell 62, the input signal lines SNS_P, SNS_N are connected to gates of opposing n-channel MOS transistors in the two differential legs. The only difference in the construction of $g_m$ cell is that it includes resistor 69, connected between the sources of these n-channel devices, where the resistance of resistor 69 is 2R, which is twice the resistance of resistors 65, 61, 63. As such, the gain of $g_m$ cell 60 is twice that of $g_m$ cell 62, which compensates for the single-ended nature of the input signal DACOUT (relative to the fixed mid-level DACMID), as opposed to the fully differential input signal SNS_P, SNS_N applied to $g_m$ cell 62.

In operation, because each of transistors 66*a*, 66*b* has its body node connected to its source, and because each of transistors 66*a*, 66*b* must conduct current $i_1$ from its corresponding current source $67_1$, $67_2$, the gate-to-source voltage ($V_{gs}$) of each of transistors $66a$, $66b$ must remain constant. As such, any difference in the voltages of signal lines DACOUT, DACMID is necessarily developed across resistor 65. In a balanced state, where the voltage at signal line DACOUT matches the voltage at signal line DACMID, no voltage is developed across resistor 65, and thus no current is conducted through resistor 65. The current conducted through transistor $64a_2$ thus corresponds to the different between current $i_2$ and current $i_1$ (i.e., $i_2-i_1$); the current conducted by transistor $64b_2$ is also the difference current $i_2-i_1$ in this balanced state.

If a non-zero differential voltage is applied at signal lines DACOUT, DACMID, however, this differential voltage is reflected across resistor 65, forcing resistor to conduct a corresponding current $\Delta i$. This current $\Delta i$ must, of course, be reflected in the currents conducted by transistors $64a_2$, $64b_2$, considering the effect of current sources $68a$, $68b$ as conducting fixed current $i_2$. For example, if line DACOUT is higher in voltage than the midlevel voltage at line DACMID, current $\Delta i$ will be conducted from left-to-right through resistor 65 in FIG. 5b. Transistor $64a_2$ will thus conduct the current $[(i_2-i_1)+\Delta i]$, while transistor $64b_2$ conducts current $[(i_2-i_1)-\Delta i]$. Because transistor $64a_1$ mirrors the current through transistor $64a_2$, and because transistor $64b_1$ mirrors the current through transistor $64b_2$, the two difference currents $[(i_2-i_1)+\Delta i]$ and $[(i_2-i_1)-\Delta i]$ are applied to summing nodes SUMP, SUMN, respectively, developing a corresponding differential voltage across resistors 61, 63. The operation of $g_m$ cell 62 is similar, such that the differential voltage at its signal line inputs SNS_P, SNS_N will result in a differential current applied into resistors 61, 63 in a similar manner. But because resistor 69 presents twice the resistance of resistor 65 in $g_m$ cell 60, the differential currents produced by $g_m$ cell will be one-half that of the currents produced by $g_m$ cell 60 for the same differential input voltage. The sum of the currents into resistor 61 from $g_m$ cells 60, 62 will thus determine the voltage at summing node SUMP, and the sum of the currents into resistor 63 from $g_m$ cells 60, 62 will also determine the voltage at summing node SUMN. The differential voltage at nodes SUMP, SUMN will thus reflect the sum of the differential input voltages into $g_m$ cells 60, 62, according to this embodiment of the invention.

One can express the balance condition in which these differential currents from $g_m$ cells 60, 62 balance one another as:

$$\tfrac{1}{2}*(SNS\_P-SNS\_N)=(DACOUT-DACMID)$$

because the gain of $g_m$ cell 60 is twice that of $g_m$ cell 62. This construction of summing block 46 is compatible with the construction of a typical single-ended DAC used as VCM DAC 40, so that the output voltage swing of sense amplifier 52 will be typically twice the output voltage swing of about the mid-level value on line DACMID. One can thus express the transfer function of summing block 46, at the differential voltage between summing nodes SUMP and SUMN, as:

$$SUMP-SUMN=2(DACOUT-DACMID)-(SNS\_P-SNS\_N)$$

As evident from this expression, the transfer function of summing block 46 is independent of resistor values and other component values, so long as the devices are properly matched, as they will be by being implemented in the same integrated circuit.

Referring back to FIG. 4, the output of summing block 46, as a differential voltage on lines SUMP, SUMN, is applied to tunable $g_m$ cell 48, which produces a differential current at outputs OUTP, OUTN corresponding to the differential voltage at outputs OUTP, OUTN. According to this preferred embodiment of the invention, tunable $g_m$ cell 48 is tunable in the sense that it can set the loop bandwidth as a function of its transconductance $g_m$, in response to a gain tuning current $i_{gmTUNE}$ generated elsewhere in the circuit.

As shown in FIG. 4, gain tuning current $i_{gmTUNE}$ is generated by programmable current source 47 within disk drive controller 7. Programmable current soured 47 is a conventional circuit for generating an analog current $i_{gmTUNE}$ in response to a reference current $i_{gmTUNE(REF)}$, and in response to a digital command $g_m$ TUNE_CMD that selects the ratio of current $i_{gmTUNE}$ to reference current $i_{gmTUNE(REF)}$. According to this preferred embodiment of the invention, this reference current $i_{gmTUNE(REF)}$, and thus gain tuning current $i_{gmTUNE}$, preferably vary with the capacitance of a capacitor that is in the same integrated circuit as tunable $g_m$ cell 48, so that the frequency response and bandwidth of this inner control loop is constant over variations in process and operating temperature, at least to a first order. As will be described below, the level of tuning current $i_{gmTUNE}$ controls the transconductance $g_m$ of tunable $g_m$ cell 48, and this transconductance $g_m$ is a strong factor in the loop bandwidth of voice coil motion control function 10. As such, it is preferred, according to this embodiment of the invention, that the level of gain tuning current $i_{gmTUNE}$ is tunable by way of digital command gm_TUNE_CMD, so that the performance of this inner control loop can be optimized. It is contemplated that the bandwidth of the control loop will typically be preset to a nominal level so that tuning current $i_{gmTUNE}$ will be preset, but that a firmware change may adjust tuning current $i_{gmTUNE}$ from that nominal level as desired. Those skilled in the art can derive variations and alternatives to programmable current source 47 that is illustrated in FIG. 4 for generating this gain tuning current $i_{gmTUNE}$.

Figure 6:
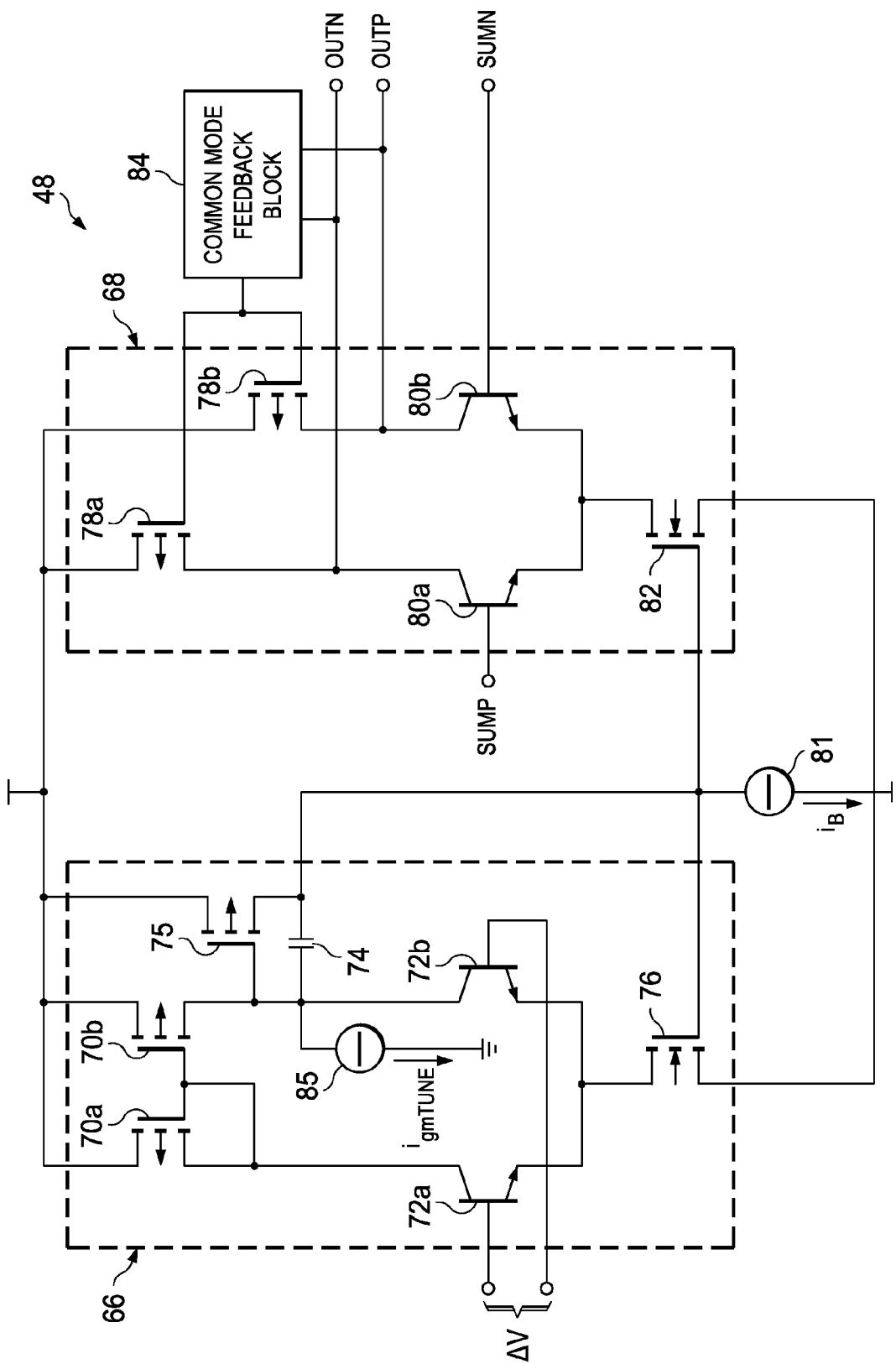
FIG. 6 is an electrical diagram, in schematic form, of a tunable $g_m$ cell in the voice coil motor control function of FIG. 4, according to the preferred embodiment of the invention.

Referring now to FIG. 6, the construction of tunable $g_m$ cell 48, according to the preferred embodiment of the invention, will now be described. It is contemplated that various conventional approaches to the construction of $g_m$ cell 48 may alternatively be used; however, it is contemplated that this particular construction shown in FIG. 6 is especially advantageous because of its stability over manufacturing and temperature variations, as well as its tunability. Tunable $g_m$ cell 48 includes master circuit 66, which controls a tail current in n-channel MOS transistor 76 and a corresponding tail current in n-channel MOS transistor 82 in slave circuit 68. Slave circuit 68 receives the differential voltage from summing nodes SUMP, SUMN, and generates an output differential current on signal lines OUTP, OUTN accordingly.

Master circuit 66 includes a differential $g_m$ cell that includes p-channel MOS transistor 70a with its source biased to the $V_{dd}$ power supply voltage, and its gate and drain connected to the collector of n-p-n bipolar transistor 72a. The second leg of this current mirror includes p-channel MOS transistor 70b with its source at $V_{dd}$, and its gate connected to the gate and drain of transistor 70a. The drain of transistor 70b is connected to the collector of n-p-n bipolar transistor 72b, which has its emitter connected in common with the emitter of transistor 72a, at the drain of tail current transistor 76. The source of transistor 76 is at ground. The bases of n-p-n bipolar transistors 72a, 72b receive a differential reference voltage $\Delta V$, which is a fixed or regulated voltage that determines the transconductance $g_m$ of tunable $g_m$ cell 48, as will be described below. Transistors 72a, 72b are matched to one another in size, conductivity, and other characteristics.

The node at the drain of transistor 70b and the collector of bipolar transistor 72b is connected to the gate of p-channel MOS transistor 75, which has its source at the $V_{dd}$ power supply voltage and its drain connected to the gate of transistor 76 in master circuit 66. This node is also connected to the gate of n-channel MOS transistor 82 in slave circuit 68, and is biased through current source 81, which conducts bias current $i_B$ to maintain transistor 75 in an on-state. Capacitor 74 is coupled between the drain and gate of transistor 75. In addition, this node at the drain of transistor 70b and the collector of bipolar transistor 72b is also connected to current source 85, which conducts current $i_{gmTUNE}$ to ground. Current source 85 may be part of programmable current source 47 (FIG. 4), a current mirror transistor mirroring such a current, or may be constructed in such other way to provide this gain tuning current $i_{gmTUNE}$ described above, as will be apparent to those skilled in the art having reference to this specification.

Slave circuit 68 includes differential pair of n-p-n transistors 80a, 80b, which are matched in size to one another and to transistors 72a, 72b in master circuit 66. The emitters of transistors 80a, 80b are connected to one another, and to the drain of n-channel MOS transistor 82, which has its gate connected to the gate of transistor 76 and its source at ground. The collector of transistor 80a is connected to the drain of p-channel MOS transistor 78a at output node OUTN, and the collector of transistor 80b is connected to the drain of p-channel transistor 78b at output node OUTP. The sources of transistors 78a, 78b are at the $V_{dd}$ power supply voltage, and their gates are controlled by common mode feedback block 84, which is a conventional common mode feedback control circuit for ensuring that the common mode voltage of output nodes OUTP, OUTN remains substantially constant within a DC operating range, as known in the art.

In operation, master circuit 66 develops a differential current through its bipolar transistors 72a, 72b in response to differential reference voltage ΔV, considering that the gate voltage of transistor 70b is slaved to transistor 70a. This differential voltage sums with the gain tuning current $i_{gmTUNE}$ to define the tail current conducted by transistor 76. To the extent that gain tuning current $i_{gmTUNE}$ causes an imbalance in master circuit 66, the drain voltage of transistor 70b will modulate, which modulates the gate voltage of transistor 76 and thus adjusts the tail current conducted by transistor 76 accordingly. Eventually, the tail current through transistor 76 is adjusted until a balanced condition is reached, at which the differential current established by differential reference voltage ΔV will be balanced by gain tuning current $i_{gmTUNE}$. At this balanced condition, master circuit 66 has a well-defined transconductance $g_m$ as follows:

$$g_m = \frac{\Delta i}{\Delta v} = \frac{\frac{i_{gmTUNE}}{2}}{\Delta V} = \frac{i_{gmTUNE}}{2\Delta V}$$

This transconductance is thus defined by gain tuning current $i_{gmTUNE}$ and reference differential voltage ΔV, and is tunable by way of controlling gain tuning current $i_{gmTUNE}$ by way of digital command gm_TUNE_CMD (assuming ΔV remains fixed), as will be described in further detail below.

This tail current conducted by transistor 76 is mirrored through transistor 82, because the gates of transistors 76 and 82 are connected together and controlled by the drain voltage of transistor 75. As such, the tail current defined by master circuit 66 is also the tail current conducted by transistor 82 in slave differential circuit 68. And because transistors 80a, 80b are matched to transistors 72a, 72b, the transconductance $g_m$ of slave circuit 68 matches that of master circuit 66, and is therefore also defined by gain tuning current $i_{gmTUNE}$ and reference differential voltage ΔV, and is tunable by way of gain tuning current $i_{gmTUNE}$. The differential voltage signal at lines SUMP, SUMN is thus reflected as a differential current at lines OUTP, OUTN, at a transconductance set by master circuit 66 as described above.

Referring back to FIG. 4, lines OUTP, OUTN at the output of tunable $g_m$ cell 48 are connected to differential inputs of power amplifier 50, which in turn produces output current $i_{OUT}$ at its differential outputs, connected to voice coil motor 12 via terminals T3, T4. Voice coil motor 12 is thus driven with output current $i_{OUT}$ (which may be of either polarity), to produce the desired torque and thus the desired rotational translation of actuator arm 17.

As evident from the electrical equivalent for voice coil motor 12 as shown in FIG. 4, and as known in the art, the inductance $L_m$ of voice coil motor 12 presents a non-ideal frequency response to the inner control loop controlled by voice coil motion control function 10. As such, loop compensation is preferably included within, or connected to, voice coil motor driver 42, as shown in FIG. 4.

Because of the construction of voice coil motor driver 42 as a fully differential stage that includes summing block 46 and tunable $g_m$ cell 48, according to this preferred embodiment of the invention, only a single compensation network of resistor $R_c$ and integrating capacitor $C_c$ connected in series with each other and in parallel with capacitor $C_p$ need be utilized across the differential output lines OUTP, OUTN to effect the desired compensation. As discussed above, conventional fully differential voice coil motor drive functions required two such compensation networks, one for each differential line. According to this embodiment of the invention, this compensation network of resistor $R_c$ and capacitors $C_c$, $C_p$ may be realized by way of external components to voice coil motor driver 42; in this case, only two external terminals and these three external components will be required, such that the cost of realizing a fully differential voice coil motor control function is not unduly increased from this standpoint.

As fundamental in the art, the frequency response of voice coil motor 12 will have a "pole" frequency $f_{pole}$:

$$f_{pole} = \frac{L_m}{R_m + R_{44}}$$

where $R_{44}$ is the resistance of sense resistor 44. Accordingly, proper compensation of the inner control loop for this pole will include a "zero" frequency $f_{zero}$ determined by the series RC network of resistor $R_c$ and capacitor $C_c$ at:

$$f_{zero} = \frac{1}{2\pi R_c C_c}$$

While this zero frequency $f_{zero}$ can be precisely realized by external components, manufacturing variations for modern integrated circuits can cause the capacitance of capacitor $C_c$ to vary on the order of 10% in either direction, and can cause the resistance value of a conventional polysilicon or diffusion resistor $R_r$ to vary even more widely.

According to the preferred embodiment of the invention, a sufficiently precise compensation network of resistor $R_c$ and integrating capacitor $C_c$ connected in series with each other and in parallel with capacitor $C_p$ may be realized "on-chip" with voice coil motor driver 42, further reducing the manufacturing cost of a disk drive system. In addition, according to this embodiment of the invention, resistor $R_c$ in this network can be realized in such a way that it can present a "zero" frequency in the frequency response that is constant, to at least a first order, over temperature and manufacturing process variations.

Figure 7:
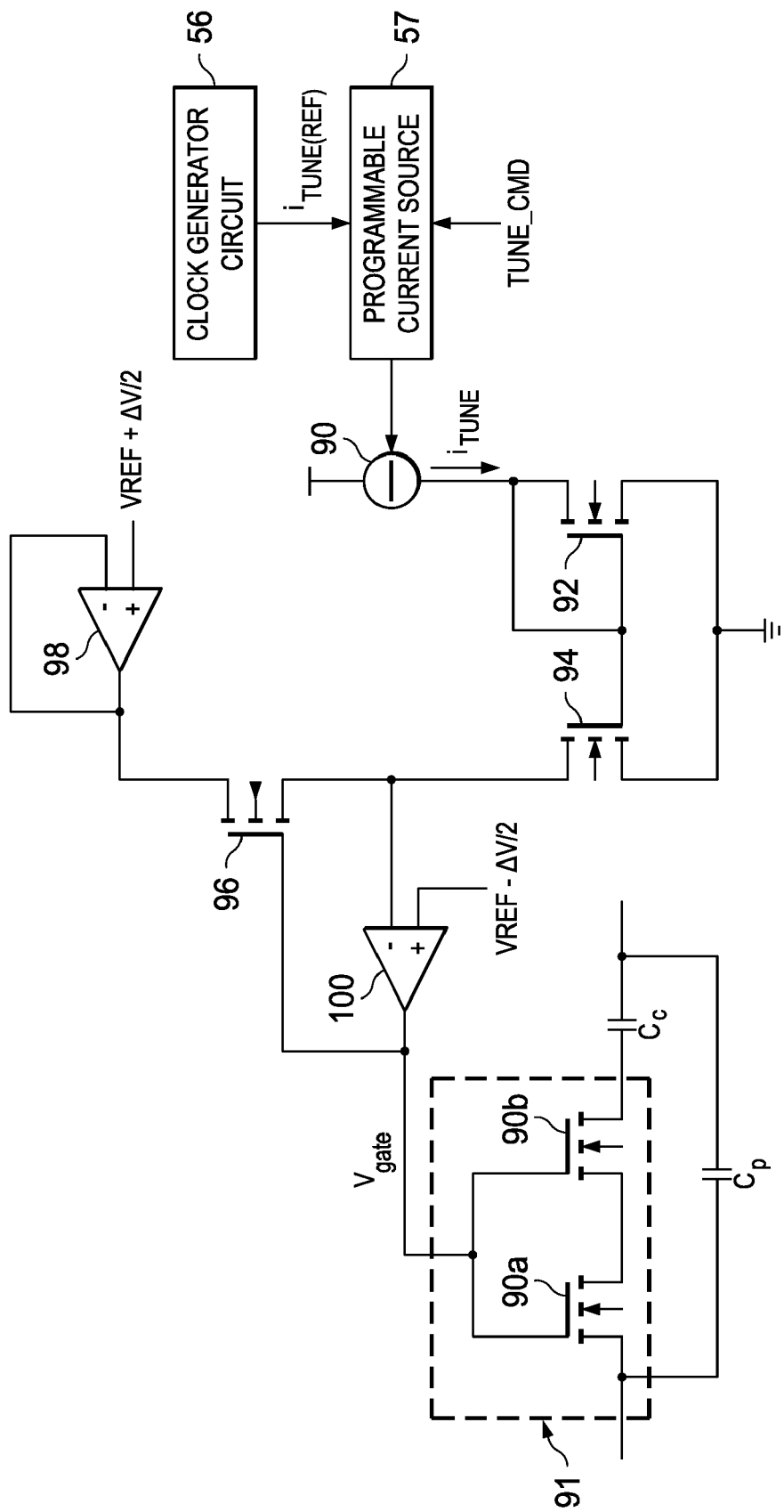
FIG. 7 is an electrical diagram, in block and schematic form, of a master circuit for controlling bias in the on-chip compensation network of the voice coil motor control function of FIG. 4, according to the preferred embodiment of the invention.

FIG. 7 illustrates the construction of on-chip compensation network of resistor 91 (having a resistance $R_c$) and integrating capacitor $C_c$ connected in series with each other and in parallel with capacitor $C_p$, according to this embodiment of the invention. According to this embodiment of the invention, frequency roll-off capacitor $C_p$ and high integrating capacitor $C_c$ are constructed in the conventional manner for integrated circuit capacitors, with capacitance values determined by the desired characteristic as will be described below. The value of roll-off capacitor $C_p$ will be selected in the conventional manner, to provide the desired roll-off gain beyond the cut-off frequency. Capacitor $C_p$ is contemplated to have a capacitance on the order of several picofarads, and as such may be readily realized within the same integrated circuit as voice coil motor driver 42. Resistor 91 in this embodiment of the invention is constructed of a pair of n-channel MOS transistors 90a, 90b, having their source-drain paths connected in series with one another and in series with integrating capacitor $C_c$. The number of transistors 90 connected in series in this manner, to realize compensation resistor 91 can vary, depending on the characteristics of voice coil motor 12. The gates of transistors 90a, 90b are connected in common with one another, biased by gate voltage $V_{gate}$. As such, gate voltage $V_{gate}$ controls the source-drain resistance presented by transistors 90a, 90b, and thus the resistance $R_c$ of resistor 91 in the compensation network.

Figure 8:
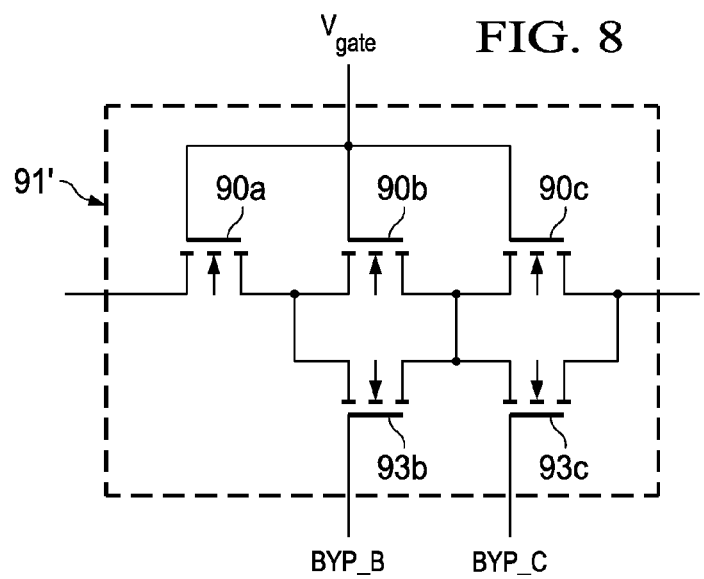
FIG. 8 is an electrical diagram, in schematic form, of a resistor in the compensation network of the voice coil motor control function of FIG. 4, according to an alternative implementation of the preferred embodiment of the invention.

It is contemplated that this number of transistors 90 in series can be programmably controlled, for example by way of switching transistors arranged in parallel with each transistor 90. FIG. 8 illustrates the construction of resistors 91' in this alternative manner, in which three transistors 90a, 90b, 90c have their source-drain paths connected in series, and their gates connected in common with one another, biased by gate voltage $V_{gate}$. In this example, transistors 90b, 90c have their source/drain paths connected in parallel with the source/drain path of a corresponding respective bypass n-channel MOS transistor 93b, 93c. The gates of transistors 93b, 93c receive independent digital control signals BYP_B, BYP_C. As such, the resistance $R_c$ of resistor 91' can be controlled by turning on either or both of transistors 93b, 93c, to short out either or both of respective transistors 90b, 90c. No bypass transistor is connected in parallel with transistors 90a, as it is contemplated that a minimum non-zero resistance value $R_c$ will always be required for compensation. In this manner, digital control of the resistance $R_c$ of resistor 91' in the compensation network is provided by this alternative implementation.

According to the preferred embodiment of this invention, gate voltage $V_{gate}$ is generated from a master-slave circuit to ensure that zero frequency $f_{zero}$ is constant over process and temperature variations. Referring back to FIG. 7, the "master" side of this master-slave circuit includes current source 90 that conducts a tuning current $i_{TUNE}$ under the control of programmable current source 57. Programmable current source 57 receives a reference current $i_{TUNE(REF)}$, upon which tuning current $i_{TUNE}$ is based. Programmable current source 57 also receives a digital command value TUNE_CMD that controls the ratio of tuning current $i_{TUNE}$ to reference current $i_{TUNE(REF)}$. For example, current source 90 may reside in a current mirror so that tuning current $i_{TUNE}$ is proportional to a current conducted within programmable current source 57; alternatively, programmable current source 57 may issue a control signal (voltage or current) to control the conduction of current source 90, in the conventional manner. According to this preferred embodiment of the invention, reference current $i_{TUNE(REF)}$, and thus tuning current $i_{TUNE}$, varies with variations in the capacitance of an integrated circuit capacitor, such as a capacitor in a clock generating circuit 56 that will be described below. In order to achieve a constant zero frequency $f_{zero}$ over process and temperature variations, to at least a first order, tuning current $i_{TUNE}$ should be based on the capacitance of a capacitor realized in the same integrated circuit as voice coil motion control function 10, so that process variations in the size and dielectric of such a capacitor are reflected in the current $i_{TUNE}$ conducted by current source 90.

Figure 9:
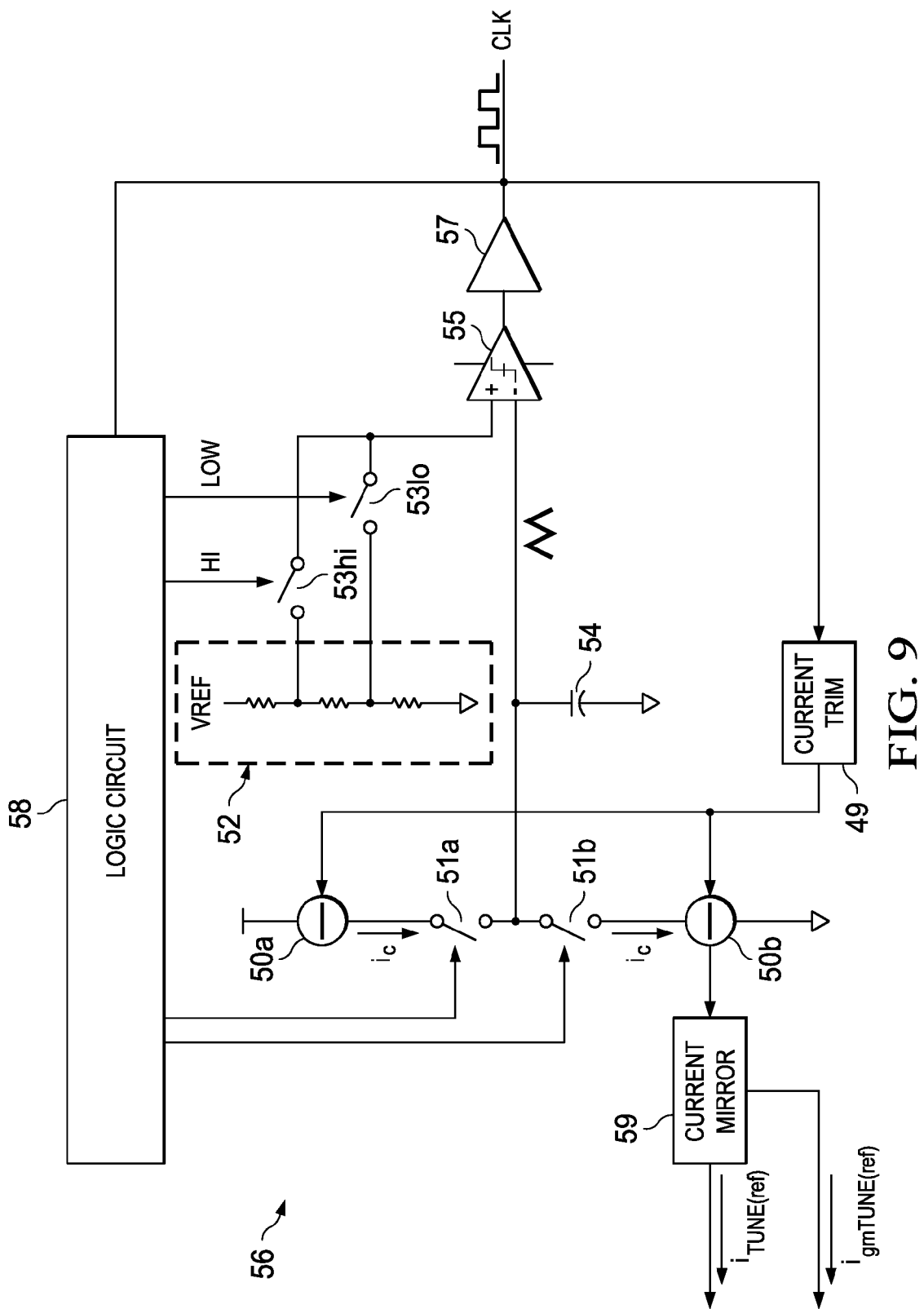
FIG. 9 is an electrical diagram, in schematic form, of clock circuitry for generating a tuning current for the on-chip compensation network of the voice coil motor control function of FIG. 4, according to the preferred embodiments of the invention.

FIG. 9 illustrates the construction of clock generator circuit 56, for generating a capacitance-dependent tuning command current $i_{TUNE(REF)}$, and for generating capacitance-dependent reference current $i_{gmTUNE(REF)}$ that is applied to programmable current source 47 (FIG. 4) for controlling the gain of tunable $g_m$ cell 48, according to this preferred embodiment of the invention. It is of course contemplated that other circuits may be used to generate these currents $i_{TUNE(REF)}$ and $i_{tmTUNE(REF)}$, and that indeed such circuits need not be clock generator circuits. Those skilled in the art having reference to this specification will be readily able to derive such alternative circuits. However, it is contemplated that it is especially convenient to use a clock generator circuit for also generating currents $i_{TUNE(REF)}$ and $i_{tmTUNE(REF)}$, for efficiency in realizing the disk drive controller functions according to this invention because such a clock generator circuit is required for operation of disk drive controller 7 for other reasons.

Clock generator circuit 56 generates an output clock signal CLK based on the charging and discharging of integrated circuit capacitor 54, which according to this embodiment of the invention is realized in the same integrated circuit as tunable $g_m$ cell 48 and power amplifier 50. Capacitor 54 is charged (relative to ground) from the $V_{cc}$ power supply via current source 50a and switch 51a, and is discharged via switch 51b and current source 50b. Switches 51a, 51b and the other switches in this circuit are, of course, implemented by way of conventional transistors, as known in the art. According to this embodiment of the invention, each of current sources 50a, 50b conduct a current $I_C$, which corresponds to the current that charges and discharges capacitor 54, and which therefore depends on the capacitance of capacitor 54. This current $I_C$ is trimmable by current trim circuit 49, based on output clock signal CLK, so that the current $I_C$ is adjusted to a level that provides clock signal CLK of the desired frequency, over variations of capacitance of capacitor 54.

Switches 51a, 51b are controlled by logic circuit 58, to operate in a complementary non-overlapping manner. It is contemplated that the frequency at which switches 51a, 51b operate is substantially higher than the RC time constant at which capacitor 54 is charged and discharged, so that the voltage across capacitor 54 is effectively a piecewise-linear triangle waveform.

Capacitor 54 is connected to the negative input of comparator 55. Comparator 55 receives, at its positive input, a selected voltage level from resistor divider 52. Resistor divider 52 is arranged as a series of resistors connected between reference voltage VREF and ground. A higher voltage node within resistor divider 52 is connected, via switch 53hi, to the positive input of comparator 55, as is a lower voltage node, via switch 53lo. Switches 53hi, 53lo are controlled by logic circuit in a complementary and non-overlapping manner, so that switch 53hi is closed while switch 51a is closed (and charging capacitor 54), and so that switch 53lo is closed while switch 51b is closed (and discharging capacitor 54). In this manner, comparator 55 effectively has two reference levels against which it compares the voltage across capacitor 54, both for the charging cycle and also for the discharge cycle. Comparator 55 thus effectively generates a square wave signal corresponding to the frequency of the switching of switches 51a, 51b. This square wave is applied to buffer 57, which generates clock signal CLK. Clock signal CLK is also fed back to logic circuit 58 and current trim 49.

As mentioned above, current trim 49 adjusts the current $I_C$ at which capacitor 54 is charged and discharged so that the frequency of clock signal CLK matches a desired frequency. As such, the current $I_C$ is increased by current trim 49 if the capacitance of capacitor 54 is higher than nominal, and decreases current $I_C$ if the capacitance of capacitor 54 is lower than nominal. Accordingly, the current $I_C$ varies with variations in the capacitance of capacitor 54.

This current $I_C$ is mirrored, via current mirror 59, to produce reference current $i_{TUNE(REF)}$ and reference current $i_{gmTUNE(REF)}$. Accordingly, each of these currents $i_{TUNE(REF)}$ and $i_{gmTUNE(REF)}$ is a fixed ratio of current $I_C$, and as such also varies with variations in the capacitance of capacitor 54. Current $i_{TUNE(REF)}$ is applied to programmable current source 57 of FIG. 7, which in turn controls current source 90, and reference current $i_{gmTUNE(REF)}$ is applied to or controls programmable current source 47 of FIG. 4.

Current source 90 may correspond to part of current mirror 59 of clock generator circuit 56, or is otherwise controlled to conduct tuning current $i_{TUNE}$ that is based on the capacitance of capacitor 54. This tuning current $i_{TUNE}$ into the drain of n-channel MOS transistor 92, which has its gate connected to its drain and also to the gate of paired n-channel MOS transistor 94; the sources of transistors 92, 94 are at ground. The drain of transistor 94, which is in the "slave" leg of this circuit, is connected to the source of n-channel MOS transistor 96, which has its drain biased by operational amplifier 98, and its gate biased by operational amplifier 100. Preferably, according to this embodiment of the invention, n-channel MOS transistor 96 is matched in size and construction to each of transistors 90a, 90b. Operational amplifier 98 has its inverting input coupled to its output, and its non-inverting input receiving a reference voltage VREF+ΔV/2, where voltage VREF is a reference voltage that substantially corresponds to the common mode voltage at the differential output lines OUTP, OUTN, and where the voltage ΔV is a constant voltage on the order of a few hundred millivolts. Operational amplifier 100 has its non-inverting input receiving a reference voltage VREF−ΔV/2, its inverting input coupled to the node at the source of transistor 96 and the drain of transistor 94, and its output driving voltage $V_{gate}$, which is applied to the gate of transistor 96 in the "slave" leg and which is also applied to the gates of transistors 90a, 90b.

In operation, the current $i_{TUNE}$ conducted by transistor 92 is mirrored at transistor 94, such that transistor 96 also conducts current $i_{TUNE}$ (the input to operational amplifier presenting a very high input impedance). Operational amplifier 98 biases the drain of transistor 96 to reference voltage VREF+ΔV/2. Operational amplifier 98, on the other hand, develops gate voltage $V_{gate}$ at a level that results in the voltage at the source of transistor 96 becoming equal to reference voltage VREF−ΔV/2. As such, the source-drain voltage of transistor 96 is forced to the voltage ΔV by operational amplifiers 98, 100. And the source-drain current of transistor 96 is forced to the current $i_{TUNE}$ by the operation of the current mirror of transistors 92 and 94. Accordingly, the source-drain resistance of transistor 94 is $\Delta V/i_{TUNE}$, as is the resistance of each of transistors 90 that collectively make up the resistance $R_c$ of resistor 91.

One can consider capacitor $C_c$ as having a capacitance value that varies with process and temperature variations as:

$$C_c = (1+\epsilon)C_0$$

where $C_0$ is a nominal value, and where $\epsilon$ is a fractional variation from this nominal value $C_0$ resulting from temperature and process variations. As discussed above, current $i_{TUNE}$ is generated to be proportional to reference current $i_{TUNE(REF)}$ that reflects variations in capacitance, such that current $i_{TUNE}$ itself also reflects variations in capacitance:

$$i_{TUNE} = (1+\epsilon)I_0$$

where $I_0$ is a nominal value for current $i_{TUNE}$. As such, the current $i_{TUNE}$ varies with variations in capacitor $C_c$, at least over a first order. And, as discussed above, current $i_{TUNE}$ can be tuned by way of programmable current source 57 or another such circuit.

As mentioned above, transistors 90a, 90b are physically matched to transistor 96, and receive the same gate voltage at approximately the same operating condition (voltage VREF being about at the common mode voltage across the differential output lines OUTP, OUTN). Each instance of transistor 90 thus presents the same source-drain resistance as the source-drain resistance $\Delta V/i_{TUNE}$ of transistor 96, and therefore the resistance $R_c$ can be derived:

$$R_c = N\left(\frac{\Delta V}{i_{TUNE}}\right) = N\left(\frac{\Delta V}{(1+\varepsilon)I_0}\right)$$

where N is the number of transistors 90 in series to form resistor 91 (N=2 in the example of FIG. 7, and N varies from 1 to 3 in the example of FIG. 8). As a result, the resistance $R_c$ can be tuned by adjusting current $i_{TUNE}$, and varies inversely with variations in capacitance due to process and temperature variations.

As discussed above, one can derive the zero frequency $f_{zero}$ determined by the series RC network of resistor 91 and capacitor $C_c$ at:

$$f_{zero} = \frac{1}{2\pi R_c C_c}$$

or, referring to the expression of the resistance $R_c$ and the capacitance of capacitor $C_c$ above:

$$f_{zero} = \frac{1}{2\pi N\left(\frac{\Delta V}{(1+\varepsilon)I_0}\right)((1+\varepsilon)C_0)} = \frac{I_0}{2\pi N(\Delta V)C_0}$$

As evident from this expression, zero frequency $f_{zero}$ is independent of deviation $\epsilon$ from the nominal due to variations in process parameters or operating temperature. As mentioned above relative to FIG. 8, a larger number N of transistors 90 may be arranged in series to form resistor 91', with switching devices 93 in parallel with one or more of those transistors 90 to provide a wider variation in the zero frequency $f_{zero}$, beyond the level of adjustment attained by trimming or adjusting current $i_{TUNE}$, if large variations in the pole of voice coil motor 12 are expected.

Assuming that zero frequency $f_{zero}$ can be selected to cancel the pole frequency $f_{pole}$ in the frequency response of the system, and assuming the capacitance of capacitor $C_p$ to be small relative to that of capacitor $C_c$, one can represent the inner control loop bandwidth BW as:

$$BW = \frac{G(drv)G(sns)R_s g_m}{2\pi(R_m + R_{44})C_c}$$

where G(drv) is the gain of power amplifier 50, G(sns) is the gain of sense amplifier 52, and $g_m$ is the gain of tunable $g_m$ cell 48. Considering that the capacitance of capacitor $C_c$ is fixed by its on-chip construction, the loop bandwidth can thus be adjusted by adjusting the gain of tunable $g_m$ cell 48 by adjusting current $i_{gmTUNE}$ via changes in the value of digital command TUNE_CMD. In addition, because gain $g_m$ of tunable $g_m$ cell 48 is dependent on its tuning current $i_{gmTUNE}$, which is itself dependent on the capacitance of on-chip capacitor 54, the loop bandwidth BW is also constant over process variations and variations in operating temperature, at least to a first order. The DC gain $G_m(\omega=0)$ of this inner control loop can be expressed as:

$$G_m(\omega = 0) = \frac{2}{G(sns)R_s}$$

This transconductance gain $G_m$ at DC remains constant.

According to this embodiment of the invention, an on-chip compensation network is provided for the inner control loop of voice coil motor control function 10, even with voice coil motor control function 10 being realized in a fully differential form. As such, not only is the important advantage of reduced linear swing headroom, enabling a lower power supply voltage, achieved according to this invention, but the on-chip realization of this compensation network reduces the number of external terminals, and external components and thus circuit board space, required to implement the disk drive controller. Furthermore, the compensation network provided according to this embodiment of the invention is also stable, to at least a first order, over process variations and variations in operating temperature, and indeed the compensating zero frequency is tunable by way of relatively simple circuit techniques.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

The invention claimed is:

1. A differential feedback control circuit, comprising:
a sense amplifier for sensing a feedback parameter and for generating a differential feedback signal;
summing circuitry for producing a differential error signal corresponding to a differential input signal and the differential feedback signal;
a tunable differential gain stage, having inputs coupled to the summing circuitry for receiving the differential error signal, and having a pair of outputs presenting an intermediate differential signal responsive to the differential error signal, the intermediate differential signal having a gain adjustable in response to a tuning current;
a differential power amplifier, for generating a differential output signal responsive to the intermediate differential signal; and
a tuning current circuit for producing the tuning current;
wherein the tunable differential gain stage comprises:
a master circuit, coupled to receive the tuning current, for establishing a tail current; and
a slave differential circuit, having first and second inputs receiving the differential error signal, for developing the intermediate differential signal responsive to the differential error signal and responsive to the tail current of the master circuit.

2. The circuit of claim 1, wherein the summing circuitry comprises:
a first transconductance cell, having inputs coupled to receive the differential input signal, and having outputs coupled to first and second summing nodes;
a second transconductance cell, having inputs coupled to receive the differential feedback signal, and having outputs coupled to the first and second summing nodes; and
first and second summing resistors, coupled to the first and second summing nodes;
wherein the differential error signal corresponds to the voltages at the first and second summing nodes.

3. The circuit of claim 2, further comprising:
a digital-to-analog converter, having an input receiving a digital command signal, and having a first output presenting an analog command signal corresponding to the digital command signal, and a second output presenting a midrange analog signal, the first and second outputs coupled to the inputs of the first transconductance cell;
wherein the differential input signal corresponds to the analog command signal and the midrange analog signal.

4. The circuit of claim 3, wherein the gain of the first transconductance cell is twice the gain of the second transconductance cell.

5. The circuit of claim 3, wherein the outputs of the digital-to-analog converter are connected directly to the inputs of the first transconductance cell.

6. The circuit of claim 1, wherein the slave differential circuit comprises:
a first transistor, having a conduction path and a control terminal, the control terminal coupled to a first signal line of the differential error signal;
a second transistor, having a conduction path and a control terminal, the control terminal coupled to a second signal line of the differential error signal; and
a tail transistor, having a conduction path coupled to a first end of the conduction paths of each of the first and second transistors, and having a control terminal coupled to the master circuit so that the tail transistor conducts a current corresponding to the tail current;
wherein the intermediate differential signal is developed across a second end of the conduction path of the first transistor and a second end of the conduction path of the second transistor.

7. The circuit of claim 6, wherein the slave differential circuit further comprises:
a first load transistor, having a conduction path connected in series with the conduction path of the first transistor, and having a control terminal;
a second load transistor, having a conduction path connected in series with the conduction path of the second transistor, and having a control terminal; and a common mode feedback circuit, having inputs coupled to receive the intermediate differential signal, and having outputs coupled to the control terminals of the first and second load transistors.

8. The circuit of claim 1, further comprising:
a compensation network, coupled to the outputs of the tunable differential gain stage, and comprising a resistor and at least one capacitor.

9. The circuit of claim 8, wherein the summing circuitry, tunable differential gain stage, tuning current circuit, and differential power amplifier are realized in a single integrated circuit;
and wherein the resistor and at least one capacitor are connected to external terminals of the integrated circuit.

10. The circuit of claim 8, wherein the summing circuitry, tunable differential gain stage, tuning current circuit, and differential power amplifier are realized in a single integrated circuit;
and wherein the resistor and at least one capacitor are realized in the integrated circuit.

11. The circuit of claim 10, wherein the resistor comprises:
at least one transistor having a conduction path connected to the at least one capacitor, and having a control terminal;
and further comprising:
bias circuitry for biasing the control terminal of the at least one transistor in the first compensation network responsive to a second tuning current.

12. The circuit of claim 11, wherein the resistor of the first compensation network comprises:
a plurality of transistors having their conduction paths connected in series, and their control terminals connected in common;
wherein the bias circuitry biases the control terminals of the plurality of transistors in the first compensation network responsive to the second tuning current.

13. The circuit of claim 12, wherein the plurality of transistors are MOS transistors having their source-drain paths connected in series, and their gates connected in common and biased by the bias circuitry.

14. The circuit of claim 13, wherein the resistor of the first compensation network further comprises:
at least one bypass transistor, having its conduction path connected in parallel with the conduction path of a corresponding one of the plurality of transistors, and having a control terminal for receiving a bypass control signal.

15. The circuit of claim 1, wherein the summing circuitry, tunable differential gain stage, tuning current circuit, and differential power amplifier are realized in a single integrated circuit;
and wherein the tuning current circuit produces the tuning current to vary with variations in a capacitor formed in the single integrated circuit.

16. A disk drive controller, comprising:
a controller;
a servo control function, coupled to the controller, for generating a torque command signal corresponding to a desired motion of an actuator arm in a disk drive responsive to signals from the controller; and
a voice coil motion control function in an integrated circuit, comprising:
a digital-to-analog converter, having an input receiving the torque command signal, and having an output presenting a differential input signal corresponding to the torque command signal;
a sense amplifier for sensing a feedback parameter and for generating a differential feedback signal;
summing circuitry for producing a differential error signal corresponding to the differential input signal and the differential feedback signal;
a tunable differential gain stage, having inputs coupled to the summing circuitry for receiving the differential error signal, and having a pair of outputs presenting an intermediate differential signal responsive to the differential error signal, the intermediate differential signal having a gain adjustable in response to a tuning current;
a differential power amplifier, for generating a differential output signal responsive to the intermediate differential signal; and
a tuning current circuit for producing the tuning current;
wherein the tunable differential gain stage comprises:
a master circuit, coupled to receive the tuning current, for establishing a tail current; and
a slave differential circuit having first and second inputs receiving the differential error signal, for developing the intermediate differential signal responsive to the differential error signal and responsive to the tail current of the master circuit.

17. The disk drive controller of claim 16, wherein the summing circuitry comprises:
a first transconductance cell, having inputs coupled to receive the differential input signal, and having outputs coupled to first and second summing nodes;
a second transconductance cell, having inputs coupled to receive the differential feedback signal, and having outputs coupled to the first and second summing nodes; and
first and second summing resistors, coupled to the first and second summing nodes;
wherein the differential error signal corresponds to the voltages at the first and second summing nodes.

18. The disk drive controller of claim 17, wherein the digital-to-analog converter, has an input receiving the torque command signal, has a first output presenting an analog command signal corresponding to the torque command signal, and has a second output presenting a midrange analog signal, the first and second outputs coupled to the inputs of the first transconductance cell;
wherein the differential input signal corresponds to the analog command signal and the midrange analog signal.

19. The disk drive controller of claim 18, wherein the gain of the first transconductance cell is twice the gain of the second transconductance cell.

20. The disk drive controller of claim 18, wherein the outputs of the digital-to-analog converter are connected directly to the inputs of the first transconductance cell.

21. The disk drive controller of claim 16, wherein the slave differential circuit, further comprises:
a first transistor, having a conduction path and a control terminal, the control terminal coupled to a first signal line of the differential error signal;
a second transistor, having a conduction path and a control terminal, the control terminal coupled to a second signal line of the differential error signal; and
a tail transistor, having a conduction path coupled to a first end of the conduction paths of each of the first and second transistors, and having a control terminal coupled to the master circuit so that the tail transistor conducts a current corresponding to the tail current;
wherein the intermediate differential signal is developed across a second end of the conduction path of the first transistor and a second end of the conduction path of the second transistor.

22. The disk drive controller of claim 21, wherein the slave differential circuit further comprises:
- a first load transistor, having a conduction path connected in series with the conduction path of the first transistor, and having a control terminal;
- a second load transistor, having a conduction path connected in series with the conduction path of the second transistor, and having a control terminal; and
- a common mode feedback circuit, having inputs coupled to receive the intermediate differential signal, and having outputs coupled to the control terminals of the first and second load transistors.

23. The disk drive controller of claim 16, further comprising:
- a compensation network, coupled to the outputs of the tunable differential gain stage, and comprising a resistor and at least one capacitor.

24. The disk drive controller of claim 23, wherein the summing circuitry, tunable differential gain stage, tuning current circuit, and differential power amplifier are realized in a single integrated circuit;
- and wherein the resistor and at least one capacitor are connected to external terminals of the integrated circuit.

25. The disk drive controller of claim 23, wherein the summing circuitry, tunable differential gain stage, tuning current circuit, and differential power amplifier are realized in a single integrated circuit;
- and wherein the resistor and at least one capacitor are realized in the integrated circuit.

26. The disk drive controller of claim 25, wherein the resistor comprises:
- at least one transistor having a conduction path connected to the at least one capacitor, and having a control terminal;

and further comprising:
- bias circuitry for biasing the control terminal of the at least one transistor in the first compensation network responsive to a second tuning current.

27. The disk drive controller of claim 26, wherein the resistor of the first compensation network comprises:
- a plurality of transistors having their conduction paths connected in series, and their control terminals connected in common;
- wherein the bias circuitry biases the control terminals of the plurality of transistors in the first compensation network responsive to the second tuning current.

28. The disk drive controller of claim 27, wherein the resistor of the first compensation network further comprises:
- at least one bypass transistor, having its conduction path connected in parallel with the conduction path of a corresponding one of the plurality of transistors, and having a control terminal for receiving a bypass control signal.

29. The disk drive controller of claim 16, wherein the summing circuitry, tunable differential gain stage, tuning current circuit, and differential power amplifier are realized in a single integrated circuit;
- and wherein the tuning current circuit produces the tuning current to vary with variations in a capacitor formed in the single integrated circuit.

* * * * *